July 11, 1933. T. H. FARIS 1,917,246
PRODUCTION OF ILLUSORY EFFECTS
Filed July 9, 1930
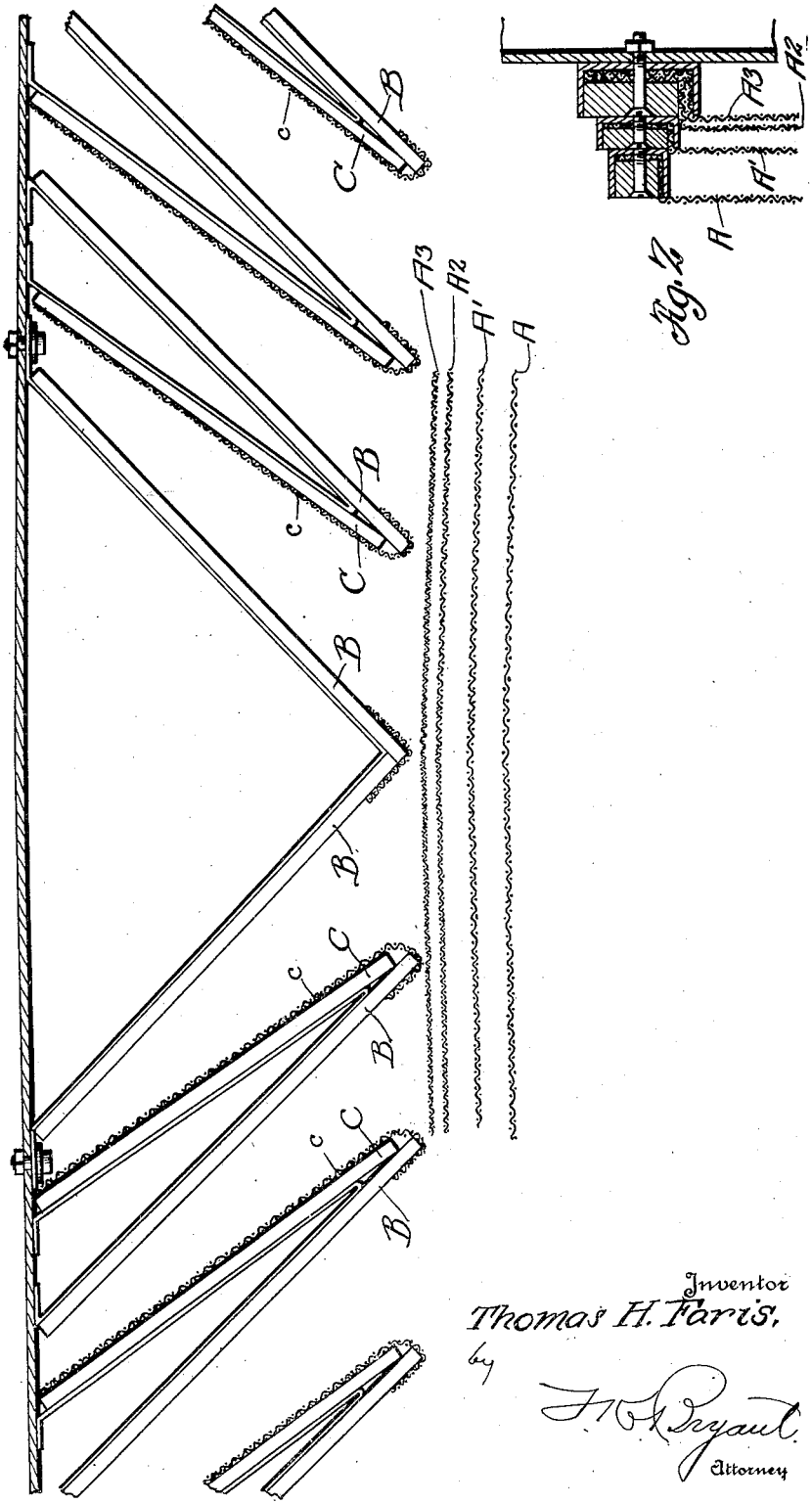
Inventor
Thomas H. Faris,
by
Attorney Patented July 11, 1933

1,917,246

UNITED STATES PATENT OFFICE

THOMAS H. FARIS, OF WASHINGTON, DISTRICT OF COLUMBIA

PRODUCTION OF ILLUSORY EFFECTS

Application filed July 9, 1930. Serial No. 466,801.

This invention relates to improvements in the production of illusory effects. While the invention is adapted for service in various relations, its greatest service appears to be in connection with the showing of projected still or moving pictures and the like, where a slide or a film contains the picture to be projected, the purpose being to give to the projected picture the appearance of a relief or stereoscopic effect, although the usual elements for producing such effects, the double picture, etc., are absent, the slide for the magic lantern, etc., and the film for the movie projection apparatus, as well as the usual apparatus itself, being employed, the effects being produced by the arrangement of the screen structure.

As is well known, stereoscopic effects, pictures which present the additional third dimension effect, are readily produced by superposing two pictures of the same object, but differing slightly in the point of vision while having equal focal length, the resulting picture presenting not only the height and width but also the appearance of depth, thus tending to the relief effect which is absent from the normal single picture presentation. This method of presenting pictures has been in use for many years for use with the stereoscope, and its principles have been applied to the presentation of projected pictures, generally by the use of a pair of the projection apparatuses, each using its individual film. This latter, however, is a somewhat expensive procedure, as compared with the usual projecting methods, since it involves the producing of the separate films, the use of the separate apparatus perfectly timed to ensure accurate superposing of the two pictures, as well as the additional operators, etc. Because of this, this method has not gone into general use.

The obtaining of these effects, however, has been desired for many years in connection with the presentation of moving pictures, etc., and many efforts and theories have been broached and presented for producing these effects. These include curtains having many different characteristics designed to affect light rays in different ways, these effects generally being produced by varying the face of the curtain in some particular way. Aside from the fact that the production of curtains of such type are extremely costly, due to the necessity for the use of special materials and the accuracy and care required in the production, the characteristics of the type are such that the effects produced have been more or less unsatisfactory, due to the fact that while the curtain itself remains stationary, the projected ray characteristics constantly change as successive pictures are shown, so that there is no assurance that a particular area of the curtain will always present the proper action as these ray conditions become changed. As a result, the type itself, although presented in many forms, has not gone into general usage.

Another type which has been contemplated is that of locating one or more screens before the usual opaque curtain. These are assumed to produce the relief effect on the basis that the wires, etc., which provide the mesh effect, present surfaces which will reflect such rays as come in facial contact with them, and as the portion of the rays which pass through the mesh will complete the picture on the rear curtain, the whole will appear as a single picture, but give the appearance of depth because of the actual spacing of the curtain and the screen or screens. While such distance is present, however, any depth effect, if present at all, is of such a slight character as to be substantially imperceptible, not differing materially from the appearance of the picture when projected on the curtain alone; and where there is a real reflecting action from the screen surface, the tendency is to disturb the appearance of the picture itself, due to the difference in the reflecting values of the opaque curtain and the screen surface. Where the curtain is in the form of a mirror, the effect is still more discordant because of the greater reflection effect of the mirror and the fact that the reflection in the latter will include the lens light radiations.

As the result of a series of experiments, I have found that the relief or stereoscopic effects can be obtained by providing a screen formation which can be considered as the image plane of the picture as viewed by the audience, and projecting the picture on to this formation from the projection apparatus, and at the same time presenting illuminating rays of less value from the opposite side of such surface, thus providing a more or less luminous effect in rear of the screen formation, the effect being to increase the contrast between the light and shadow tones of the picture, and at the same time produce the illusion of depth to the picture being presented. To produce this effect it is essential, of course, that the rear lighting effect be properly positioned with respect to the different zones of tone shading of the picture so that the relative values of these be maintained, but intensified. Otherwise, the picture itself will tend to simply preserve the normal tone shadings with the shadows less deep. But by proportionately increasing the value of the difference in intensity between any two tone shades, the contrast as a whole is proportionately increased, and the tone value differences between high lights and shadows will appear to be increased.

For instance, assuming a man standing in front of a building and distant therefrom; under these conditions there would necessarly be light between the man and building when thus positioned. A picture of these, however would not give this latter appearance, and it requires an unconscious mental action by one looking at the picture to properly position the man relative to the building. Under the method herein disclosed, however, the effect is materially changed, due to the fact that the shadows which mark the outline of the man and his clothing become relatively greater as respects the tone values of the higher light values, and with the luminosity effect present, the picture itself tends to present the effect of light in rear of the man, and he appears as if actually standing the proper distance from the building. By increasing the gradation in intensity between the various tone values, the distinction between high lights and shadows has been so increased as to produce the illusion effect.

And in this connection an additional advantage is secured. With the picture source in the form of a photographic film, for instance, it will be understood that the photographing action has provided a large number of tonal shades in which differences in tonal values would be imperceptible to the eye when viewing the film. When projected on a screen, however, the enlargement presents these more clearly, and by including these in the proportionate change referred to, the appearance of the picture itself continues that perfect blending effect which is found in the picture of the film, but having the advantage of the great contrasting effect and thus increasing the illusion of depth to the picture.

The effect is produced by the use of screen members such as above referred as one of the types, but by a substitution for the opaque curtain in rear of the screens. In projecting moving pictures, for instance, any attempt to provide a physical light arrangement in rear of the audience image plane above referred to, with a view to producing the effect, would be practically impossible because the positions of shadows and high-lights etc., are constantly changing, and it would be impossible to shift the lighting features to produce the proper compensation. Because of this condition, I employ the projection apparatus itself as the source of the light, and, by the substitute formation in connection with the screens, provide the proper light effect at the proper points in the picture as the latter is exhibited, the picture itself positioning the location of the light effects by its own tonal values.

To these and other ends, therefore, the nature of which will be more readily understood as the invention is hereinafter more fully set forth, said invention consists in the improved method and apparatus for carrying it out as hereinafter more fully disclosed, illustrated in the accompanying drawing, and more fully pointed out in the appended claims.

In the accompanying drawing, in which similar reference characters illustrate corresponding parts in each of the views.

Figure 1 is a view, in top plan form and somewhat diagrammatic, of a portion of a screen and rear structure arrangement in accordance with the present invention; and Figure 2 is a detail sectional view of one of a number of ways in which the screens may be supported, the view showing, to some extent, the spacing of the screens relative to each other.

The screens, of which four are preferably used, are indicated at A, A', A2 and A3, being suitably attached to the frame work on which the structure is supported, Fig. 2 illustrating a simple way in which they can be supported by the use of channels and filler blocks, suitably assembled by the use of screws, etc., so as to extend vertically in front of the rear formation, the spacing relative to the latter being illustrated, for instance, in Figure 1. The screen employed, of wire, galvanized or otherwise coated, or the equivalent of such coated wire fabric, may differ in size of mesh; thus the interstitial arrangement through which the light rays reach the structure in the rear is substantially that of the screen of least mesh size, and although the front screen A will present but a portion of the wires which would be visible when visually inspected from a close distance, the wires visible from a close distance, the wires visible from a close distance, the wires visible from a close distance, the wires visible through the openings of this screen A at such time, and through the openings of the succeeding screens, cause the whole to present the effect of a screen made up of small openings, when viewed from a close distance, the wires, however, appearing at different distances from the eye.

It should be noted that the drawing is illustrative only, it obviously being impossible to illustrate the structure in the form of the complete screen with proper dimensional effects. For this reason the illustration made can be considered as that of a small section of a screen, such, for instance, as would be presented by cutting out a small section of the screen. For instance, the front to rear length of one of the louvers would be simply a few inches, with the spacing between successive pairs at the front of the louvers a matter of inches—generally less than two inches. With the dimensions of a screen for use including many square feet of surface on the audience image plane, it will be readily understood that the number of louvers shown in the drawing would include but a minor fractional section of the screen, the particular section shown being taken from the center to illustrate the ability to provide the angularity of louvers to be arranged in opposite directions.

As will be understood, during the projection of a picture on to the screen group, the front surface of each of the wires accessible to the projection rays, will be illuminated and form a reflecting surface for such rays proportionately to the tonal value of a particular portion of the picture. When the picture is being projected, and viewed from the usual distance, the mesh characteristic of the screen group becomes invisible, the image plane of the picture, as seen by the audience, being that of the screen A, although each of the other screens is active in developing the portrayal by the wire illumination referred to. If, however, the assembled screen structure is inspected from a distance of two or three feet during this period, the mesh characteristic will not only be apparent, but it is possible to see that each screen itself presents an imperfect image plane characteristic; when, however, it is viewed from a distance in excess of twelve feet, these characteristics disappear and the projected picture will appear with screen A apparently presenting the image plane viewed by the audience.

Such picture, however, would be imperfect in the absence of an arrangement in the rear which will serve as a substitute for the usual opaque curtain before referred to, since an interstitial characteristic is present and unless the rays which pass therethrough are intercepted, only that portion of the rays which illumine the front face of the wires would be active, and thus render the picture imperfect. Where the curtain is the usual opaque curtain, the rays are intercepted and thus tend to complete the picture, but there is no material relief effect present. The reason for this can be understood from the fact that the spacing between screens is small, and the illumination can only be on the portions of the wire accessible to the rays through the openings of the screen or screens in front. If there were any material relief condition thus set up, it would necessarily distort the appearance of the picture, since the regularity of the mesh and openings could readily place an illumined wire portion of screen A3, for instance, at a point where no relief would be desired; a picture of a man wearing evening dress clothes with a white expanse of shirt front, would present the latter as of an odd appearance, if the relief condition were noticeable, since the area illuminated would cover a large number of the mesh squares.

This ability to provide relief effect would not be aided by substituting a mirror for the opaque curtain, since the effect above pointed out would not be changed. The fact, however, that the mirror would necessarily reflect the rays reaching it, with substantially the same intensity as when coming from the projection machine, and of greater intensity than the surface of the wire mesh, would inherently produce a spotty effect due to the variation in intensity of the rays visible to the audience within the same zone, the wire surface being inferior to the mirror as a reflecting surface.

This latter condition makes it evident that if any reflecting surface of the mirror type is to be used as a substitute for the rear opaque curtain, it must be so arranged that the rays of light passing through the interstices are not reflected back directly on to the audience image plane; simple angularity of mirror surfaces to avoid this condition, however, causes the rays to be reflected elsewhere and the result if directed away from the audience image plane, is to lose their effect in completing the picture, thus losing the effect produced by a rear opaque curtain and with no compensating effect; if the mirror directs the rays on to a different part of the screen group, the arrangement becomes useless since the illumined portion may be made manifest in a shadow zone of the picture.

However, in the formation of the substitute for such rear opaque curtain in producing the present invention, mirrors or their equivalent are used. These are in the form of what may be termed louvers, and preferably arranged along the lines illustrated in Fig. 1, this arrangement being designed with a louver extending vertically the full height of the curtain. It is not essential that a louver be of a single piece of mirror glass, and can be fashioned of a number of pieces, thus making possible the use of scraps of ordinary mirror material. The vertical arrangement of the louvers is preferred because of the simple formation; the entire screen and curtain arrangement is designed to extend across the stage on an arc of which the projection apparatus provides the center, so that, if the louvers extended horizontally instead of vertically, it would be necessary to arrange them linearly in this arc and to provide top to bottom arc construction of a similar radius. This can be done, of course, and such arrangement is included within the invention.

The louvers are arranged in two series, this arrangement being symmetrical on opposite sides of the center of the curtain. One of these series has its louvers indicated at B, the other being indicated at C. The louvers B extend at an angle of substantially 45° to the line of projection, and are of suitable width, five or six inches, for instance, and are adapted to receive the projection rays which pass through the interstices of the screens. At the vertical center of the curtain area, two of these louvers B are arranged at approximate right angles to each other, and the remaining louvers B are arranged substantially parallel to these at regular distances, the louvers on one side thus projecting at substantially right angles to those of the other side of the central pair. The spacing of the louvers is such that a major portion of the width of a louver is hidden from view, when viewed from the front, as shown. While the louvers B are not exactly parallel in arrangement, they are practically so, since the variation is so small as to be more or less negligible, as they extend at an angle of 45° to a radius of the arc of which the projection machine is the center; with a radius length in excess of a hundred feet, the variation from true parallelism is small.

The louvers C are arranged in the spaces between adjacent louvers B, and extend angular to and face the latter, so that a pair of these louvers B and C will reflect images back and forth between them. For instance, the front edge of one of the louvers C contacts with louver B of the next pair near the front edge of the latter, but has its rear edge at a point intermediate the rear edges of the two louvers B between which it is located, preferably closer to the louver B with which it forms the working pair, the back surface of a louver C of one pair facing the back surface of louver B of the next pair, the two thus forming an acute angle between them. The arrangement is such that louvers C are completely hidden when viewed from the front, so that no ray reaches these louvers direct from the projector.

Each louver C is covered by a screen c of small mesh; it is of a smaller mesh than the remaining screens, and extends around the front of the contacting louver edge portions; a strip also extends over the front of the central pair of louvers B.

The louver arrangement is mounted in a suitable frame located at the back, and the whole arrangement is mounted on the stage preferably back a suitable distance from the stage front, with the ends of the assembly arranged to provide suitable light absorbing characteristics opposite the audience. The particular arrangement in this respect or the form of the arrangement at the top of the louver assembly can obviously be made to suit the particular installation. It is preferred, however, that the entire assembly be tilted slightly rearward at the top relatively to a plane normal to the plane of a ray which extends from the axis of the lens to the center of the assembly.

As will be obvious the pairs of mirrors will produce various image effects within the pair, and these will vary more or less with differences of angularity of the mirrors of a pair relative to each other. For this reason no attempt is made to present the possible detail actions in this respect. In order, however, that the general characteristics of these can be understood, a description of a number of experiments are presented, these being as follows:

With an assembly of this type and of a size adapted for use with a home projecting machine of standard make, the screens A—A3 were raised to expose the louver structure beneath. With no film present, and with the lens cap removed, the machine was placed a short distance from the louver structure with the lens facing one of the louvers B, the lens axis extending in the direction of normal projection, excepting that the lens axis extended horizontally while the louver structure remained in the tilted position it occupied when the normal operation was being had; this would permit a more ready inspection of the individual effects produced.

In one of the experiments of this character, and with the end of the lens a number of inches from the louver, the initial projection circular area presented a somewhat different character from that which was present when the lens was positioned within an inch or two of the louver, but the remaining effects were substantially similar.

With the first of these experiments, it was noted that, viewed from the front, a circular spot appeared with no material radiant effect, a spot such as would appear if the mirror surface were at an angle of approximately 45° to the line of incidence, the angular surface of the louver reflecting these rays at right angles to the line of incidence on to louver C; the spot simply gave the ordinary reflection condition which would be provided. However, within the spot itself was seen the luminous image of a mesh structure, and the reflection from this was directly toward the eye when in this position. It was evident that this radiant image was the reflection of that portion of screen c of louver C of the pair, to which the light rays were being reflected from the spot on louver B. Since this area was being illumined because of the rays, the front surface of the wires of the mesh would be illuminated, and the illumination reflection would be visible within the spot area, and hence, visible to the eye. although the image on louver C was invisible to the eye; the reflected rays from the illumined portion of screen c appearing in the spot on louver B were of course being reflected toward the eye from louver B along the lines of incidence but in the reverse direction from that of the rays projected from the lens.

When the position of the eye was changed so as more nearly to approach a right angle to the plane of louver B, it was noted that the spot was more or less elongated, in a front to rear direction, since the light rays were being projected on to a surface which was extended at an angle (45°) to the line of incidence. Presumably the resulting reflection in louver C was also varied from the true circle, since the immediate source of the image (the image in louver B) varied in this respect.

In addition, there were seen a number of additional images, extending in more or less of a ring series of somewhat double images, in which could be noted the luminous mesh areas, these growing fainter as the ring progressed; it was noted that in these additional image reflections the luminous mesh areas did not present the luminosity to the eye which was made manifest with the initial image, thus indicating that the immediate line of incidence for each image was changed and did not coincide with the initial line, a result to be expected from the arrangement of the pair of louvers relative to each other. The independence of the various images was made more distinctive perhaps by reason of the greater tilting effect of the louver structure relative to the line of incidence due to the change of the machine from its normal projecting position.

The effect produced, however, was that of a marked illumination of the louver B in a zone corresponding to the vertical position of the lens relative to the height of the louver, the remaining portions of the louver remaining dark. The reason for this could be understood from the fact that the ring of images which included the luminous portions were serving as a means for illuminating the zone, without, however, providing a general illumination of the louver, since the illumination was being provided by images which were being reflected back and forth between the pair of louvers within the zone, thus limiting the illumination to the zone in which these reflections were taking place.

In shifting the position of the eyes to note different effects, one position was found in which the lens itself with its ray radiations could be seen, thus indicating that in the rotation of the various image planes seen on louver B, a point was reached where the angle of reflection had produced the reverse line of incidence effect to this particular position of the eyes. It was noted, in this connection, that the image lens appeared to be in a position of depth considerably beyond the depth provided by the front to rear dimension of the louver structure, thus bearing out the expected result that the succession of images would produce the illusion increasing depth.

The initial effect of the other experiment referred to was changed in that the spot itself appeared very luminous, but appeared to be more or less rough and uneven but without any marked change in luminosity in different portions of the spot. It is evident that in this position of the machine the light rays were of such intensity that the image itself was more or less that of the lens, with the roughened appearance produced by the reflection of the illuminated area of screen c, but with the value of the latter reflections, produced by the illumination of the wires, of not sufficient value to overpower the value of the spot luminosity to produce distinct image effects, although sufficient to disturb the regularity of the spot luminosity produced by the lens image. An image directly in rear of the spot, with marked mesh luminosity, was noted, and with the luminous ray effect directed in the direction of the line of incidence. The former effect of the partial ring of images was also noted, as well as the marked illumination of the front to rear zone.

The two experiments referred to were made at different times, and it is possible that, in addition to the difference in the focal length of the projection referred to, the machine may have been so positioned in the two experiments as to produce different directions of the line of incidence, no attempt being made to obtain accuracy in having the line of incidence exactly at the proper angle to the plane of louvre B. A difference in this respect can explain some of the differences found in the resulting effects.

The different results found in the two experiments referred to can also indicate the fact that there is one image, amongst the many presented, which has its image plane so positioned as to set up this reverse line of incidence condition of the mesh illumination, in the direction corresponding to the line of incidence. Of the images presented, one, of superior intensity, had this characteristic. This appears indicative of the fact that minor variations in the relation between the line of incidence and the angle of the louver B do not affect the operation of the louver structure in producing this reverse line of incidence condition such as to present an image reflection corresponding to the line of incidence.

These conditions indicate reasons for two of the conditions noted, the appearance of gradually fainter showing of the imaged mesh, and the presence of the illumined zone from front to rear of the louver. The image planes of the images are not parallel, and when viewed from the front, are seen on the basis of different angles of reflection and hence present views of the mesh wires from different angles. The reverse line of incidence of each image, however, is present but extends in some direction across the space between a pair of louvers B and C, thus presenting an illuminated image in this direction, with the result that the various images present illuminated conditions on opposite sides of the space to produce the luminous zone, while one of the images presents its reverse line of incidence in substantial alinement with the initial line of incidence.

A third experiment included the use of a film within the machine: as this type of machine permits the film to remain stationary without danger, a film picture was placed in position within the machine which was moved away from the louver structure (the screens A—A3 remaining raised) a distance of several feet to obtain an intensive focus and with the machine arranged to more nearly approach the proper angle of projection. The projected picture was thus of a size to extend over a considerable portion of the louver structure and thus included a number of the louvers within the projection area. The particular film employed contained the showing of a portion of a house in which a white window sill was shown, thus presenting a part which had defined lines and which would present conditions of wide contrast with the adjacent portions of the picture.

The white portion, when projected, had a length to extend over the spaces between two pairs of the louvers, and thus presented the condition that its length reached practically on to three of the louvers B, and, in addition, extended over the edges of these louvers over which the screens c were extended. The resulting face on which the picture was projected was thus made up of the mirror surfaces provided by the louvers B with these spaced by the non-mirror ends of the louvers, these latter spaces carrying the small mesh screen formation which is present over the louvers C. Consequently, the image produced by the projection of the white sill portion could indicate the possibilities of any material break in the continuity of the image because of the non-mirror space at the edges of the louvers, and also the difference in effect produced by the fact that a portion of the image was being seen as a reflection in the mirror surfaces and the remainder as the reflection from the wires of the mesh draped over the edges in single thickness.

If viewed from the distance of a foot or two, the mesh formation could be seen as well as the irregular front surface of the structure, but the image of the sill presented the same color in the different parts and the defining lines of the sill remained substantially constant, depending on the point at which they were viewed; because the mesh was visible, the solidity of the image was not as pronounced over the mesh portions, but it required somewhat critical examination to determine this. When viewed from a distance sufficient to render the mesh characteristic invisible, and more nearly approaching the normal focal length used in viewing pictures, no distinction could be made, and the sill presented its proper relation to the rest of the picture. It was evident that the characteristics present in the other experiments referred to, were present, the portion of the image which was seen in the louvers being that provided from one of the image planes which was presenting its image on the basis of the reverse line of incidence being substantially alined with the line of incidence, while the remaining images were producing the zone illumination extending from front to rear rear of the louvers, the contrast between this portion of the picture and the adjacent darker portions being very marked. But, in addition, the color characteristic remained constant throughout the length and was present within this illumined zone, as well as on the illumined surface of the wires of the mesh and the mirror image. This result is an expected one from the fact that the reflection from the wire mesh would be that which was causing the particular color of the illumination, and this would be repeated in each of the images.

This latter condition was tested further by the use of a film which carried a number of letters colored to an approximate orange hue. The same characteristics appeared, the illuminated zone in this case having this color characteristic, wherever the images appeared, the illuminated zone of the mesh c produced by the initial reflection, necessarily presenting the illumination in the color controlled by the film itself, and which would be presented on the screen portions at the edge of a louver, so that the various images which included the illuminated zone of the mesh, would present this color characteristic within the images which were being presented in the ring series within this zone. In this respect, the luminosity at the rear was not as great as in the experiment using the film having the white sill; in the latter the entire space between louvres was included within the length of the sill, so that the area included in the reflected screen illumination was maximum with the result that each image was of maximum dimensions and the maximum area of each image was being made effective as an illuminating source. In the other case, however, although the number of images were the same, the illuminated mesh zone would be that provided by the outline of the letters, with the result that only this portion of an image was being made effective in illuminating the front to rear zone.

In each of the experiments with the films, it was noted that where the film presented the deep shadow tones, no illumination whatever was presented in the louver structure. Where the tones shaded as between high lights and shadows, the same contrasts were present in the louver showing, with the condition present, that a variation which increased the light would be intensified, due to the fact that whatever the tonal value presented by the film, that particular tone value was present in each image and was adding its share to the illumination of the zone. A reason for this can be seen from the fact that a maximum image length, from front to rear, would be that presented by the distance between the mouth of the pair of louvers, and this would remain constant; the area of the screen $c$ illuminated by the initial reflection would, however, depend upon the film, and it would be this area which was effective as an illumination source within that maximum area of the image; as the illumined area increased, or became more intense in luminosity in response to the initial reflection, the same change became manifest in each of the images, with the result that the change in luminosity of the zone became more marked, since the variation was not simply in a single image but in each of the images, thus varying the luminosity condition within the zone to an increased degree and intensifying the value accordingly.

From this it became apparent that the closer the tone value of a particular area of the picture approached the "high light" condition, the more intense became the luminosity zone, and thus intensified the contrast between the area and the shadow area, the latter remaining dark, or presenting subdued luminosity depending on the depth of the shadow area itself, and depending on the character of the illumination of the screen $c$ resulting from the initial reflection from louver B. And since the screen illumination presented the color characteristic presented by the film, the color variations between the high light and shadow portions of an ordinary film, the color characteristics produced with colored films would produce similar effects.

From the above it is possible to understand the action when screens A—A3 are in proper position. At such time the projection of the picture on to the screens provides an illumination of these in accordance with the characteristics of the film itself, the light rays illuminating the wires in accordance with the ray values wherever the wires intercept the rays. Those rays which are not intercepted pass on to the particular louver B which may be in rear, where the action shown by the experiments, becomes manifest to set up the conditions of an image of screen $c$ in rear of the screens and which has its reverse line of incidence alined with the line of incidence of the ray itself, and producing the luminosity of the zone in rear of the screens of a value dependent on the tonal value set up by the area of the film which is active within a particular portion of the louver structure. In those portions of the louver structure which present the edges of the louvers, the mesh $c$ which overlies the edge is serving the purpose of an additional screen back of the front screens and thus continues the mesh characteristic which is being supplied by the image at the rear through the louvers B.

In other words, the louver structure in rear of the screens A—A3 performs a double function.

The first of these is that of providing the equivalent of additional screens of considerably smaller mesh in rear of the group of screens A—A3. This additional screen effect is made up of the actual mesh structure which extends over the front edge of the louvers, and the image screen portion. Both of these have the tone and color characteristics which would be found on the illumined wires of an actual screen of this mesh if positioned in rear of the group of screens, for reasons pointed out above. And in this latter connection it can be understood that the angularity of the pair of louvers, to the line of incidence and to each other, is such as to tend to decrease the mesh dimension, in width, when the image on louver B is viewed along the line of incidence, due to the fact that the front to rear length of the image on the louver is angular to the plane of screens A, A3, and when viewed from a direction normal to the plane of the screens presents the image length in the terms of the base line of a triangle of which the louver B corresponds to the hypothenuse of such angle, so that the length of the image along the hypothenuse is translated to an image length on the base line, with the line of incidence indicating the direction of the third line of the triangle.

As a result, the picture, when viewed from the front will have the characteristics of a picture projected on a screen group such as A—A3 to which has seemingly been added the effect of additional screens of smaller mesh dimension, an arrangement which would tend to decrease the interstitial portion of the screen and present a greater wire surface on which illumination is had. Consequently, the mesh characteristic will disappear where viewed with a considerably shorter focal length of vision.

The interstitial condition of the screen thus remains, but the effect of the seeming additional screens, with the illumination attendant, is to reduce the dominant characteristic of the wire components of the screen. Since the effect of additional screens adds to the illuminated portion of the picture, it serves to reduce the focal length necessary to render the mesh characteristic invisible to the audience.

The second function of the louver structure is to provide the intensifying action discussed above. To enable the film to control in this action, it is necessary that the interstitial formation of the screens A—A3 be such as to permit sufficient light rays to pass through the screen group to produce the illumination of screen $c$ as indicated above, and to permit this result the size of the interstices of the screen group is necessarily greater than whose of screen $c$. The remainder of the zone illumination referred to is provided by the image reflection, but it is essential to illumine the initial area of screen $c$ to produce the image illuminations which are presented in the particular zone, and this is provided by the rays which reach louver B through the screen group. As pointed out above, the zone illumination in rear of the screen group serves to intensify the tonal value and tends to produce a luminosity in rear of the audience image plane in direct correspondence with the various tones presented on that image plane and with the variations in tonal values presented on the audience image plane but with the intensity of such value increasing at large ratio in the direction of the high light condition than is present on the audience image plane, due to the plurality of images active within the louver structure. By increasing the intensity of the tonal values, the contrast between lights and shadows appears more pronounced, with the resultant stereoscopic effect made active.

As will be understood from the above, screen $c$, itself hidden from the audience by its location over louver C, serves the purpose of a diffusing screen whenever illuminated by the rays passing through the openings of the screen group and which are reflected from louver B, the screen $c$ thus serving somewhat as a secondary source of illumination, this source being located in rear of the audience image plane provided by the screen group, the secondary source being made manifest with respect to the audience image plane by the reverse line of incidence effect referred to.

As pointed out, the primary illumined area of screen $c$ depends for its location and dimensions, as well as its tonal characteristics, on the primary rays which are being reflected from the primary area on louver B, the location, dimensions, and tonal characteristics of the primary area of louver B being dependent on the primary rays which pass through the screen group.

However, because of the repetition of images in rear of the primary areas, and in the production of which the secondary source is active, the zone in rear of the audience image plane within which these areas are located, provides a luminosity effect entirely in rear of the audience image plane, the luminosity having its tonal characteristics similar to but of less intensity than the tonal characteristics of the primary rays from the projection source, the luminosity effect, of course, being made manifest relative to the audience image plane, rays from the luminous zone being re-directed toward the openings of the screen group which forms the audience image plane.

Obviously, the diffusing surface of screen $c$ is inactive, excepting when the primary area is made active by primary rays reflected from louver B, the sole illumination of the louvers being by the primary projected rays. Hence, the luminous zone in rear of the audience image plane becomes manifest instantly when developed by the primary rays, and the zone becomes inactive when the primary rays no longer reach louver B within the zone. As a result, shifting in location of similar primary rays, as with moving picture projection, or the change in tonal characteristics, within the same zone becomes instantly responsive within the zone itself, the luminosity effect of the latter being directly responsive to the activity of the primary rays from the projection source.

Since the audience image plane composed of two or more members as A, A', etc., is provided by the screen group having a mesh-like characteristic, the illumination of the mesh strands from the primary source would, in the absence of the luminous zone in the rear of the audience image plane, tend to render the strands effect more or less visible to the audience, due to the marked contrast between the illumined strands and the spaces which form the openings of the screen group. With the luminous zone active in rear of the audience image plane, with similar location, dimensions and tonal characteristics, differing only in intensity, the direct contrast condition is overcome, and the delineation of the strands is no longer dominant, being visible only when viewed from a short distance—a few feet—less than that provided by the seating arrangement of the theatre projecting the picture.

While the picture would be presented on the audience image plane by the use of the additional screen as an actuality, and with the probability that the mesh characteristic would disappear at about the same focal length as above, the picture thus projected would have simply the light and shadow characteristics as are found in the film itself, since no intensifying action would be present. By the use of the louver structure, not only is this result obtained, so far as the complete portrayal of the structure is concerned, but, in addition, the tonal value intensifying action is produced, an action which has the illusory effect of seemingly providing the third dimension of depth to the picture being projected.

While the experiments referred to were produced on a structure designed for use with a home projecting apparatus, and thus had overall dimensions suitable for such use, the screens, etc., used were those which would be employed in an installation adapted for the largest movie houses, the structure of the experiments thus being similar to a structure which could, for instance, be cut out of the central portion of a large structure. In other words, an installation of the largest size would involve simply an increase in the dimensions of the various screens, the lengthening of the several louvers to obtain the proper height, and the use of an increased number of louvers to obtain the width of the desired structure. Since the focal length of the projecting apparatus used in the experiments was short (about twelve feet) as compared with that of the projection apparatus of the movie houses, generally in excess of a hundred feet, the arc on which the louver structure was arranged is of shorter radius than would be present in the larger installations. Since, however, the same general principles apply with either installation, this particular change did not materially affect the character of the experiments.

One condition will be understood, of course, when the installation is on the large scale. The picture will be enlarged many times from what appeared on the structure of the experiments, with the result that a high light portion which, for instance, would be limited to one or two pairs of louvers in the smaller structure, would extend over a large number of pairs in the larger installation, with the result that there would be less likelihood of a particular louver B being called upon to take care of a number of tonal values in the same zone with respect to the rear luminosity. No difficulty in this respect was encountered in the projection of various films used for home projection purposes, and because of the enlargement conditions, would be unexpected on large installations.

This latter condition is also of advantage in connection with the projection of films in color, a service for which the structure is especially useful, due to the fact that the entire structure is such as to present an accurate portrayal of the film regardless of the coloring of the film. When the large projections are made, there is less likelihood of a multitude of colors being presented within the same general zone of a pair of louvers.

While the structure is particularly useful in connection with the projection of pictures, etc., it will be readily understood that the structure can be used in other ways. For instance, by placing a colored light design in rear of the louver structure, it remains hidden from direct view in this position, the louvers acting to present a design upon the audience image plane; if the lighting arrangement be of the dissolving type, a novel display can be produced on such plane. This is possible because of the fact that the rear of the louver structure is open between pairs of louvers, and the light rays therefrom can have access to the mirror surfaces. And, obviously, lamps can be placed between louvers and produce interesting effects; for instance, an arrangement of colored lamps at the bottom of the louver structure, operating with a master make and break device, can provide illumination of the various areas between pairs of louvers and produce variegated effects which, through the image action can present interesting displays for the benefit of the audience.

Aside from the advantages indicated above, there are a number of others which can be referred to. For instance, there is no particular difficulty in positioning the screens to provide the desired arc on the audience image plane, and the louver arrangement is such as to permit its ready installation on the same basis, the front edge of the louvers B being located on the arc line, with the angle arranged on the basis of the radius of the arc. With the parts arranged in this way, and properly positioned on the stage, with proper arrangement at the ends and top of the structure to prevent light rays reaching the audience image plane, maximum results are obtainable.

The materials of which the structure is formed are such as to be non-inflammable, thus eliminating likelihood of fires from this source. The rear of the structure is open thus making it possible to keep in proper working order, and aiding in acoustical effects.

Another possible advantage presented by the arrangement is found in the fact that since the louver arrangement serves to increase the contrast characteristic as between tones of the portrayal, the strength of the projecting rays may be reduced by reducing the strength of the light source, thus tending to reduce the amount of electric current used.

While it is preferred to employ mirror surfaces as the reflecting surfaces, it will be readily understood that the louver members may be of other material treated to provide reflecting surfaces, it being understood that since each member of a pair, louvers B and C, are individual in action and produce no effect on other pairs, a change such as this is open for selection. In case of metal, for instance, a polished surface may serve the purpose, thus making it possible to employ comparatively thin metal and reduce the width of the edge portions accordingly, in addition, it would be possible to replace the screened member above referred to by suitable roughening of the surface or limitating the screen characteristic thereon. The mirror surfaces appear to be preferable, but the invention is not limited to such use.

While I have herein disclosed one or more ways in which the invention may be carried into effect, it will be readily understood that changes or modifications therein may be found essential or desirable in meeting the various exigencies of service and use, and I desire it to be understood that I reserve the right to make any and all such changes as may seem essential or desirable insofar as the same may fall within the spirit and scope of the invention as expressed in the accompanying claims when broadly construed.

I claim:—

1. In the production of illusory effects, a succession of screen members arranged in front to rear succession and each having openings for the passage of light rays, said members forming a group adapted to provide an audience image plane in presence of still or moving picture projection by a projecting apparatus serving as the source of portrayal on such plane, and means extending relatively angular to and in rear of the screen group for producing and directing ray emanations having their source in the projector rays and corresponding in tonal characteristics with those from the projecting apparatus but of less intensity to cause such portrayal to present simulated stereoscopic effects on such plane, said means being controlled as to activity by the light rays projected from such source of portrayal.

2. In the production of illusory effects, a succession of screen members arranged in front to rear succession and each having openings for the passage of light rays, said members forming a group adapted to provide an audience image plane in presence of still or moving picture projection by a projecting apparatus serving as the source of portrayal on such plane, and means extending relatively angular to and in rear of the screen group for producing and directing ray emanations having their source in the projector rays and corresponding in tonal characteristics with those from the projecting apparatus but of less intensity to cause such portrayal to present simulated stereoscopic effects on such plane, said means including pairs of surfaces arranged relatively to each other and to the line of incidence of projected rays as to produce multiple effects upon the pair surfaces by light rays from the source passing through the screen group on to one of the surfaces of the pair, one of said surfaces providing said ray emanation production with the other surface active as a ray-directing surface.

3. Means as in claim 2 characterized in that one of the surfaces of a pair is screened, with the initial light ray impingement provided on the unscreened surface, the surface arrangement being such that the angle of incidence of the impinging rays will illuminate a portion of the screen of the screened surface to include such illuminated portion within such image.

4. Means as in claim 2 characterized in that one of the surfaces of a pair is screened, with the initial light ray impingement provided on the unscreened surface, the surface arrangement being such that the angle of incidence of the impinging rays will illuminate a portion of the screen of the screened surface to include such illuminated portion within such image, the relative arrangement of a pair of surfaces being such that an illumined portion of one of the images will extend on an image plane active to provide an angle relation corresponding to but opposing the lines of incidence of the projected rays and be positioned in rear of the portion of the screen group traversed by the rays producing the image illumination.

5. Means as in claim 2 characterized in that one of the surfaces of a pair is screened, with the initial light ray impingement provided on the unscreened surface, the surface arrangement being such that the angle of incident of the impinging rays will illuminate a portion of the screen of the screened surface to include such illumined portion within such image, the image produced by a series of adjacent light rays being located within a zone of the pair of surfaces defined positionally in vertical dimension by the position and vertical dimension of the group screen area traversed by such rays.

6. In the production of illusory effects, a succession of screen members arranged in front to rear succession and each having openings for the passage of light rays, said members forming a group adapted to provide an audience image plane in presence of still or moving picture projection by a projecting apparatus serving as the source of portrayal on such plane, and means extending relatively angular to and in rear of the screen group for producing and directing ray emanations having their source in the projector rays and corresponding in tonal characteristics with those from the projecting apparatus but of less intensity to cause such portrayal to present simulated stereoscopic effects on such plane, said means including pairs of surfaces, the surfaces of a pair being facially opposed and arranged relative to the audience image plane as to permit light rays traversing lines of incidence passing through the screen group to reach one surface of the pair directly and the other surface indirectly from the first surface, the second surface being screened, whereby light ray projection on the first surface will produce illumination of an area of the second surface screen and provide multiple image effects on the pair of surfaces.

7. In the production of illusory effects, a succession of screen members arranged in front to rear succession and each having openings for the passage of light rays, said members forming a group adapted to provide an audience image plane in presence of still or moving picture projection by a projecting apparatus serving as the source of portrayal on such plane, and means extending relatively angular to and in rear of the screen group for producing and directing ray emanations having their source in the projector rays and corresponding in tonal characteristics with those from the projecting apparatus but of less intensity to cause such portrayal to present simulated stereoscopic effects on such plane, said means including pairs of surfaces, the surfaces of a pair being facially opposed and arranged relative to the audience image plane as to permit light rays traversing lines of incidence passing through the screen group to reach one surface of the pair directly and the other surface indirectly from the first surface, the second surface being screened, whereby light ray projection on the first surface will produce illumination of an area of the second surface screen and provide multiple image effects on the pair of surfaces, said images including an image of the illumined portion of the second surface.

8. In the production of illusory effects, a succession of screen members arranged in front to rear succession and each having openings for the passage of light rays, said members forming a group adapted to provide an audience image plane in presence of still or moving picture projection by a projecting apparatus serving as the source of portrayal on such plane, and means extending relatively angular to and in rear of the screen group for producing and directing ray emanations having their source in the projector rays and corresponding in tonal characteristics with those from the projecting apparatus but of less intensity to cause such portrayal to present simulated stereoscopic effects on such plane, said means being controlled as to activity by the light rays projected from such source of portrayal, said means including a plurality of pairs of reflecting members, one of the members of a pair having its surface in front to rear direction of the member extending angular to a line of incidence, the second member of the pair extending angular to the first member, the angularity of the two members being such as to permit access of source light rays to the reflecting surface of the second member only by reflection from the first member, and a screen element overlying the reflecting surface of the second member.

9. Means as in claim 8, characterized in that similar members of successive pairs extend in substantial parallelism.

10. Means as in claim 8, characterized in that similar members of successive pairs extend in substantial parallelism, with the first members of successive pairs spaced apart a distance such that the maximum length of the zone of impingement of projected light rays on to the first member of a pair of members is limited to a front to rear dimension of approximately half of the total member distance in this direction.

11. Means as in claim 8, characterized in that similar members of successive pairs extend in substantial parallelism, with the first members of successive pairs spaced apart a distance such that the maximum length of the zone of impingement of projected light rays on to the first member of a pair of members is limited to a front to rear dimension of approximately half of the total member distance in this direction, and with the zone of impingement located within the forward portion of the member when viewed from the front.

12. In the production of illusory effects, a succession of screen members arranged in front to rear succession and each having openings for the passage of light rays, said members forming a group adapted to provide an audience image plane in presence of still or moving picture projection by a projecting apparatus serving as the source of portrayal on such plane, and means extending relatively angular to and in rear of the screen group for producing and directing ray emanations having their source in the projector rays and corresponding in tonal characteristics with those from the projecting apparatus but of less intensity to cause such portrayal to present simulated stereoscopic effects on such plane, said means including pairs of reflecting-surface members in facial opposition, with the members of a pair having louver characteristics and extending angular to each other, one of said members of a pair being screened rearwardly from its forward edge, similar members of successive pairs being in substantial parallelism, the position and angularity of the screened surface member being such as to cause the screened member to be substantially hidden by the unscreened surface member of the succeeding pair when viewed from the front.

13. In the production of illusory effects, a succession of screen members arranged in front to rear succession and each having openings for the passage of light rays, said members forming a group adapted to provide an audience image plane in presence of still or moving picture projection by a projecting apparatus serving as the source of portrayal on such plane, and means extending relatively angular to and in rear of the screen group for producing and directing ray emanations having their source in the projector rays and corresponding in tonal characteristics with those from the projecting apparatus but of less intensity to cause such portrayal to present simulated stereoscopic effects on such plane, said means including pairs of reflecting-surface members in facial opposition, with the members of a pair having louver characteristics and extending angular to each other, one of said members of a pair being screened rearwardly from its forward edge, similar members of successive pairs being in substantial parallelism, the position and angularity of the screened surface member being such as to cause the screened member to be substantially hidden by the unscreened surface member of the succeeding pair when viewed from the front, the front edge portion of the screened member of one pair and the front edge portion of the unscreened member of the succeeding pair being arranged to substantially close the space between such pairs of members.

14. In the production of illusory effects, a succession of screen members arranged in front to rear succession and each having openings for the passage of light rays, said members forming a group adapted to provide an audience image plane in presence of still or moving picture projection by a projecting apparatus serving as the source of portrayal on such a plane, and means extending relatively angular to and in rear of the screen group for producing and directing ray emanations having their source in the projector rays and corresponding in tonal characteristics with those from the projecting apparatus but of less intensity to cause such portrayal to present simulated stereoscopic effects on such plane, said means including pairs of reflecting-surface members in facial opposition, with the members to each other, one of said members of a pair being screened rearwardly from its forward edge, similar members of successive pairs being in substantial parallelism, the position and angularity of the screened surface member being such as to cause the screened member to be substantially hidden by the unscreened surface member of the succeeding pair when viewed from the front, the front edge portion of the screened member of one pair and the front edge portion of the unscreened member of the succeeding pair being arranged to substantially close the space between such pairs of members, at least one of said edge portions being screened.

15. Means as in claim 12, characterized in that the pair of members are arranged in two series in which the unscreened members of one series are arranged at substantial right angles to the similar members of the other series, said series dividing the means into two portions with the first unscreened members of the two series having the planes of their surfaces intersecting substantially at their front edges, with the front edges in substantial contact, and with such intersecting planes at similar angle to such audience image plane.

16. Means as in claim 12, characterized in that the pairs of members are arranged in two series in which the unscreened members of one series are arranged at substantial right angles to the similar members of the other series, said series dividing the means into two portions with the first unscreened members of the two series having the planes of their surfaces intersecting substantially at their front edges, with the front edges in substantial contact, and with such intersecting planes at similar angle to such audience image plane, the edge portions of said first unscreened members being screened.

17. The method of producing illusory effects which consists in using a front to rear succession of screen members to form an audience image plane for portrayal of still or moving pictures with the several members having openings for the passage of light rays from and forming part of the picture portrayal being projected, deflecting the rays passing through the openings on a light-diffusing surface positioned in rear of the audience image plane and hidden from audience vision, the rays received by such surface being diffused in directions angular to the direction of the projected rays to produce a luminosity effect in rear of the audience image plane with the luminosity having its tonal characteristics similar to but of less intensity than the tonal characteristics of the rays projected from the projection source, and re-directing rays of the luminosity development to the openings of the screen.

18. A method as in claim 17 characterized in that the rear luminosity effect is produced by a series of luminous image areas each presenting the tonal characteristics of the projected rays but of less intensity.

19. A method as in claim 17 characterized in that the rear luminosity effect is produced by a series of luminous image areas each presenting the tonal characteristics of the projected rays but of less intensity, with the series located in a front to rear zone corresponding in vertical position to the ray area of the audience image plane active in producing the luminosity effect.

In testimony whereof I affix my signature.

THOMAS H. FARIS.